(12) United States Patent
Woo et al.

(10) Patent No.: US 7,222,224 B2
(45) Date of Patent: May 22, 2007

(54) SYSTEM AND METHOD FOR IMPROVING PERFORMANCE IN COMPUTER MEMORY SYSTEMS SUPPORTING MULTIPLE MEMORY ACCESS LATENCIES

(75) Inventors: Steven C. Woo, Saratoga, CA (US); Brian H. Tsang, East Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 383 days.

(21) Appl. No.: 10/850,803

(22) Filed: May 21, 2004

(65) Prior Publication Data

US 2005/0262323 A1 Nov. 24, 2005

(51) Int. Cl.
*G06F 12/00* (2006.01)
*G11C 7/00* (2006.01)

(52) U.S. Cl. .......................... 711/167; 711/5; 711/170; 711/202

(58) Field of Classification Search ..................... None
See application file for complete search history.

(56) References Cited

U.S. PATENT DOCUMENTS

| | | | |
|---|---|---|---|
| 6,621,315 B2 | 9/2003 | Heo et al. .................... 327/158 |
| 6,646,953 B1 | 11/2003 | Stark .......................... 365/233 |
| 6,658,523 B2 * | 12/2003 | Janzen et al. ................ 711/105 |
| 6,785,793 B2 | 8/2004 | Aboulenein et al. ......... 711/167 |
| 6,807,609 B1 * | 10/2004 | Lemmon et al. ............. 711/150 |
| 6,877,079 B2 * | 4/2005 | Yoo et al. ..................... 711/167 |
| 7,020,757 B2 * | 3/2006 | Ruhovets et al. ............ 711/167 |
| 7,089,412 B2 * | 8/2006 | Chen ............................. 713/2 |
| 2002/0129215 A1 * | 9/2002 | Yoo et al. ..................... 711/167 |
| 2004/0105292 A1 * | 6/2004 | Matsui ........................ 365/63 |
| 2004/0143773 A1 * | 7/2004 | Chen ........................... 713/400 |
| 2004/0193821 A1 * | 9/2004 | Ruhovets et al. ........... 711/167 |
| 2005/0044304 A1 * | 2/2005 | James ......................... 711/105 |
| 2005/0210216 A1 * | 9/2005 | Jobs et al. ................... 711/170 |

OTHER PUBLICATIONS

International Search Report for International Application No. PCT/US2005/01846, dated Jan. 11, 2006.
Rambus Inc., "Rambus® Inc. 32 and 64 bit RIMM™ Module Technology Summary," Ver. 0.0, Jun. 2001.
SoftVerx, "SDRAM v. RDRAM—Facts and Fantasy," published on pcbazar.com, publication dated unknown.

* cited by examiner

*Primary Examiner*—Kevin Verbrugge
(74) *Attorney, Agent, or Firm*—Morgan, Lewis & Bockius LLP (57) ABSTRACT

A memory system having multiple memory devices reduces average access latency by enabling different latencies for different regions of physical memory, providing an address map conducive to placing frequently accessed memory addresses into the lowest latency regions of physical memory; and assigning the frequently accessed memory addresses to the lowest latency regions of physical memory.

38 Claims, 7 Drawing Sheets

SYSTEM AND METHOD FOR IMPROVING PERFORMANCE IN COMPUTER MEMORY SYSTEMS SUPPORTING MULTIPLE MEMORY ACCESS LATENCIES

TECHNICAL FIELD

The disclosed embodiments relate generally to computer memory systems and methods, and in particular to performance improvements in memory systems supporting multiple memory access latencies.

BACKGROUND

As computer systems continue to evolve, memory systems are becoming a limiting factor on overall system performance. While the importance of memory bandwidth continues to increase, memory latency still plays a significant role in system performance. For example, at higher signaling rates, propagation delays between multiple ranks of memory devices can exceed one clock cycle, potentially resulting in different access latencies between different ranks of memory devices. Memory systems that use Direct Rambus Dynamic Random-Access Memory (RDRAM) are one example of such systems. Other memory types, such as Double Data Rate (DDR) and DDR-II employ signaling and interconnection topologies that potentially allow different ranks of DRAMs (e.g., different memory modules) to have different access latencies.

Systems using Direct RDRAMs have utilized channel levelization (hereinafter also referred to as "global levelization") to enforce one uniform latency across all ranks of DRAMs by adding delay to those ranks of devices that can respond earlier than others. This results in increased effective bandwidth because data bubbles that exist between different ranks of DRAMs are eliminated. It also simplifies the design of the memory controller. While channel levelization provides some important benefits, it also has the negative effect of increasing DRAM latency for ranks of devices that could otherwise respond at lower latencies. As a result, in some applications there can be a loss of performance due to global levelization.

DESCRIPTION OF EMBODIMENTS

Overview

As described in more detail below, in a method of controlling access to the memory devices in a memory system, the memory devices in the memory system are allocated to latency groups including a first latency group and a second latency group. The first latency group has a lower latency than the second latency group. In addition first and second portions of a memory address space are identified and the first portion of the address space is mapped to at least one memory device allocated to the first latency group while the second portion of the address space is mapped to at least one memory device allocated to the second latency group. Providing the first portion of the address space with a lower access latency than the second portion of the address space can result in improved memory system performance. In some embodiments, more than two latency groups and more than two portions of memory address space are used.

In some embodiments, a memory device includes a memory array coupled to a command interface, which is adapted to be coupled to a memory system for receiving a delay value. The memory device also includes a delay device coupled to the command interface and an output data path. The delay device is configured to delay data retrieved from the memory array and transmitted on the output data path for a delay period determined by a delay value. In other embodiments, a latency control signal may be used to control memory access latencies.

In some embodiments, a method of controlling access to memory devices in a memory system supporting multiple memory access latencies includes decoding a memory access request to provide a memory device identifier; identifying a latency group associated with the memory device identifier, wherein the latency group is one of a plurality of latency groups in the memory system; comparing the identified latency group with a latency group associated with a previous memory access request; and generating a timing control signal in response to the result of the comparison. In some embodiments, a memory controller is configured to perform this method of controlling access to memory devices in a memory system by comparing the times of the previous and current memory access requests, and then using the result of the comparison in combination with the latency group information for the previous and current memory access requests to determine whether to delay issuing the current memory access command to avoid a bus collision.

An advantage of group levelization is that most of the implementation burden is in software (e.g., BIOS). For example, the technique can be implemented in an off-the-shelf memory controller (e.g., SiS R658) as a BIOS option that can be enabled by motherboard manufacturers, system integrators, end users and the like. Because most of the implementation burden is in software, end-users can select from a large number of device ID/rank mappings or generate their own custom mappings.

Global Levelization

Figures 1A, 1B:
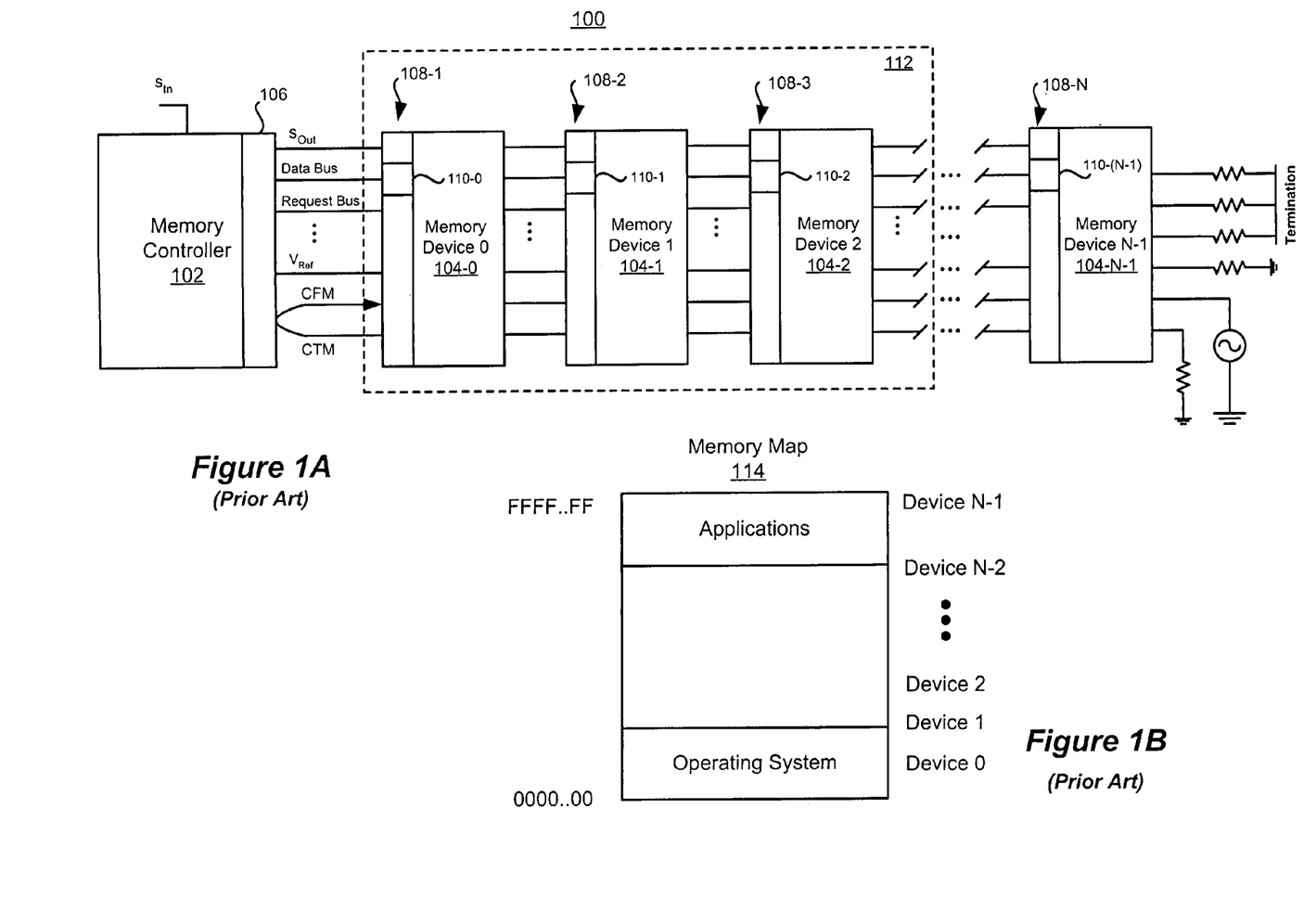
FIG. 1A is a block diagram of a memory system employing global levelization.
FIG. 1B is a memory map for a memory system employing global levelization.

FIG. 1 is a block diagram of a memory system 100 employing global levelization. The memory system 100 includes a memory controller 102 coupled to one or more memory devices 104-1, . . . , 104-N connected in series via a number of parallel transmission lines (hereinafter also referred to as the "channel"). In some embodiments, the parallel transmission lines include a data bus, a request bus, a reference voltage ($V_{Ref}$) line, a clock to master (CTM) line, a clock from master (CFM) line, and a serial ($S_{Out}$) bus. In other embodiments, additional or other configurations of busses or transmission lines may be used. The memory devices 104 (e.g., DRAM, RDRAM) can be discrete memory chips or part of a memory module 112 (e.g., SIMM, DIMM, RIMM, C-RIMM). Note that while FIG. 1A shows a memory system architecture typically used with RDRAM, the disclosed techniques are applicable to any memory system architecture with multiple access latencies (e.g., DDR, DDR-II, etc.).

In some embodiments, the memory controller 102 includes a high-speed memory interface 106 for communicating with the memory devices 104. Each of the memory devices 104 includes a command interface 108, which includes a programmable delay device 110, which can be configured to provide the necessary delay to adjust access latency. The memory devices 104 may reside at different electrical distances from a memory controller 102, resulting in different times of flight for signals between the memory devices 104 and memory controller 102. The memory devices 104 may also support different CAS latencies, leading to differences in access latencies by the memory controller 102. In some embodiments, the programmable delay device 110 for each respective memory device 104 is configured to store output data for a respective specified period of time, such that data arrives at the memory controller 102 in response to a memory access operation at a time that is independent of the memory device accessed. Thus, each memory device 104 in the memory system 100 responds with the same latency $L_G$ as the highest latency memory device 104 in the memory system 100 (i.e., memory device 104-N).

In some embodiments, the delay devices 110 are implemented using well-known programmable delay devices and design techniques. As clock speeds increase, however, it becomes increasingly difficult to design a delay device 110 that can provide the delays required by global levelization without significantly impacting the design (e.g., increased size) of the memory devices 104 and/or memory controller 102, or restricting the system to a limited number of memory devices 104. In some embodiments, the delay devices 100 are implemented using a shift register and an output multiplexer for delaying an output data signal by a specified number of clock cycles. The specified number of clock cycles is stored in a register in the memory device in which the delay device is embedded. In some embodiments, the register can be loaded via a register write operation performed by the memory controller 102 during initialization. In other embodiments, the register can be loaded with a variable delay that is encoded into a command sent by the memory controller 102 to the memory device. The number of clock cycles can be determined during initialization by calculating the memory access latency of the memory device that is furthest from the memory controller 102.

In conventional memory systems, including memory systems that use global levelization, memory addresses are allocated to the memory devices 104 in a conventional manner. As shown in FIG. 1B, a conventional memory allocation scheme may allocate the Operating System (OS) procedures to low addresses (and growing upwards as more memory is needed) and application programs to high addresses (and growing downwards as more memory is needed). Furthermore, memory addresses are mapped (as shown by map 114) to the memory devices 104 in a linear manner, with the lowest addresses mapped to the memory devices at one end of the channel (e.g., the memory devices closest to the memory controller 102) and the highest addresses mapped to the memory devices at the other end of the channel. In the example shown in FIG. 1B, only a fraction of the memory space is in use by the operating system and applications, which is typical during normal operation of many computer systems. The address mapping scheme described above results in OS procedures being stored in the memory devices 104 closest to the memory controller 102 and the most frequently used application programs being stored in memory devices 104 furthest away from the memory controller 102. This memory allocation methodology is not a problem in computers using a memory system with global levelization, because access latency $L_G$ is independent of the memory device being accessed. However, this memory allocation methodology may perform suboptimally in systems where different memory devices have different access latencies.

Group Levelization

Figures 2A, 2B:
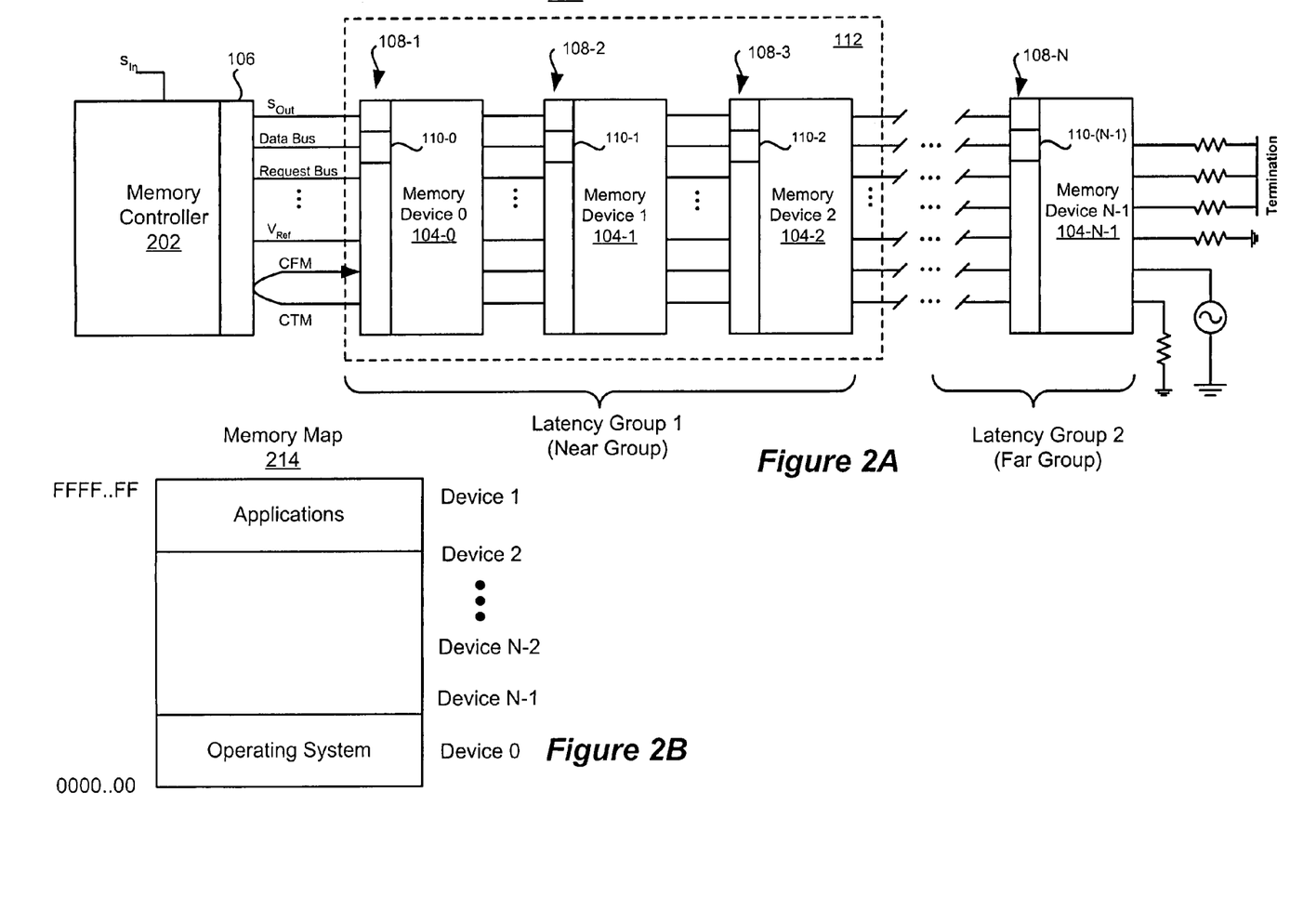
FIG. 2A is a block diagram of a memory system employing group levelization.
FIG. 2B is a memory map for a memory system employing group levelization.

FIG. 2A is a block diagram of a memory system 200 employing region-based group levelization. The memory system 200 is similar to memory system 100, except for the manner in which memory addresses are mapped to the memory devices 104. In addition, the programmable delay devices 110 are configured in system 200 so that memory devices in each latency group have a common access latency, but each latency group has a distinct access latency, with the devices in the latency group closest to the memory controller 202 having a lower access latency than the devices in the latency group furthest from the memory controller 202.

In memory system 200 the memory devices 104 closest to the memory controller 102 (e.g., devices 104-0, 104-1 and 104-2) are mapped or otherwise allocated to frequently accessed memory locations (e.g., address locations used by application programs and the operating system), and memory devices 104 furthest from the memory controller (e.g., 104-5 through 104-N) are mapped or otherwise allocated to less frequently accessed memory addresses. Note that an operating system can take advantage of this mapping by preferentially allocating memory from the lowest latency groups first to improve performance. Also, when memory is full, the operating system can monitor which areas of memory are most frequently accessed, and then move data back and forth between lower and higher latency groups to improve performance. It is also possible to dynamically change the number of devices in each latency group to optimize system performance by monitoring memory system activity to determine the optimal average system latency as a function of factors such as memory bandwidth needs and application memory footprints, and then reallocating devices among the latency groups if such reallocation will improve predicted system performance.

FIG. 2B shows a memory map 214 for use with group levelization. The Devices 1 and 2 (104-1, 104-2) are mapped to the addresses for application programs, while Devices 5 through N (104-5 through 104-N) are mapped to less frequently accessed memory addresses. Note that the OS procedures are still mapped to the first device in the channel (Device 0) because the OS procedures are accessed even more frequently than the application programs. More generally, the addresses for OS procedures and the most frequently used application programs are mapped to memory devices in the lowest latency group, $G_1$. Latency groups are discussed next.

In addition to allocating memory devices 104 to portions of the memory address space, each memory device 104 is assigned to one of a set of latency groups $G_1 \ldots G_N$ each having a different latency. For example, in FIG. 2A the channel is split into two latency groups of memory devices 104, hereinafter referred to as latency groups $G_1$ (Near Group) and $G_2$ (Far Group). Memory devices 104 allocated to latency group $G_1$ are levelized to latency $L_1$ of the highest-latency device in the group (measured in clock cycles), while memory devices 104 allocated to latency group $G_2$ are levelized to latency $L_2$ of the highest latency device in group $G_2$. In some embodiments, latency $L_2$ is N clock cycles higher than the $L_1$ latency of group $G_1$, or $L_2=L_1+N$, where N is selected based on various criteria, including without limitation the ratio of a memory bus clock cycle to a controller clock cycle, the length of a data packet in clock cycles, and the latency difference, while the delay devices are set to zero delay, between the largest latency device in group $G_2$ and the largest latency device in group $G_1$. In some embodiments, N is equal to 4, which is the length of a data packet, in memory bus clock cycles in at least some memory systems that use RDRAM devices.

The latency $L_1$ and N can be determined based on a number of factors, including without limitation, system configuration, number of ranks of memory devices, device density, motherboard layout, Front Side Bus (FSB) speed, memory bus speed, memory controller clock speed, latency needed to match the timing of the front side bus, and transfer rate of the memory devices 104. The number of memory devices 104 allocated to a particular latency group can be set as desired based on the application. Thus, by using group levelization there is a potential performance improvement compared to global levelization having latency $L_G$ when the following expression is satisfied:

$$L_1 < L_G \leq L_2 \quad (1)$$

While the embodiment described above has two latency groups, in other embodiments more than two latency groups are used.

Figure 3:
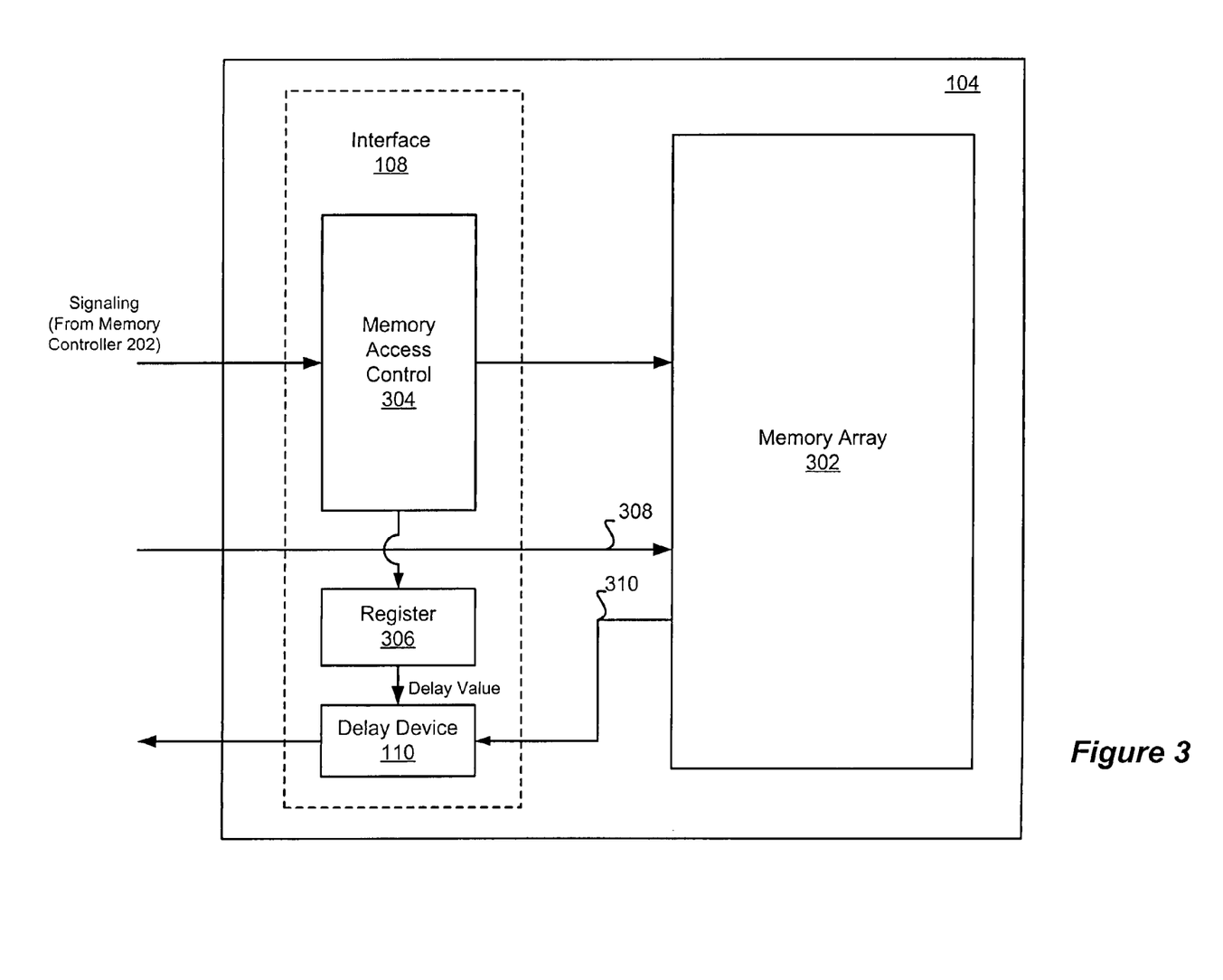
FIG. 3 is a block diagram of a memory device for use in group levelization.

FIG. 3 is a block diagram of a memory device 104 for use in group levelization. The memory device 104 generally includes a command interface 108 coupled to a memory array 302. The command interface 108 includes memory access control 304 for processing signals received from the memory controller 202 and for providing memory access commands (e.g., read, write) to memory array 302. The memory device 104 includes input and output data paths 308 and 310. The output data path 310 is coupled to a programmable delay device 110, which delays data retrieved from memory array 302 in accordance with a delay value stored in register 306. The delay value (which can be measured in clock cycles) is determined by a latency control signal sent by memory controller 202, as described with respect to FIG. 4.

Figure 4:
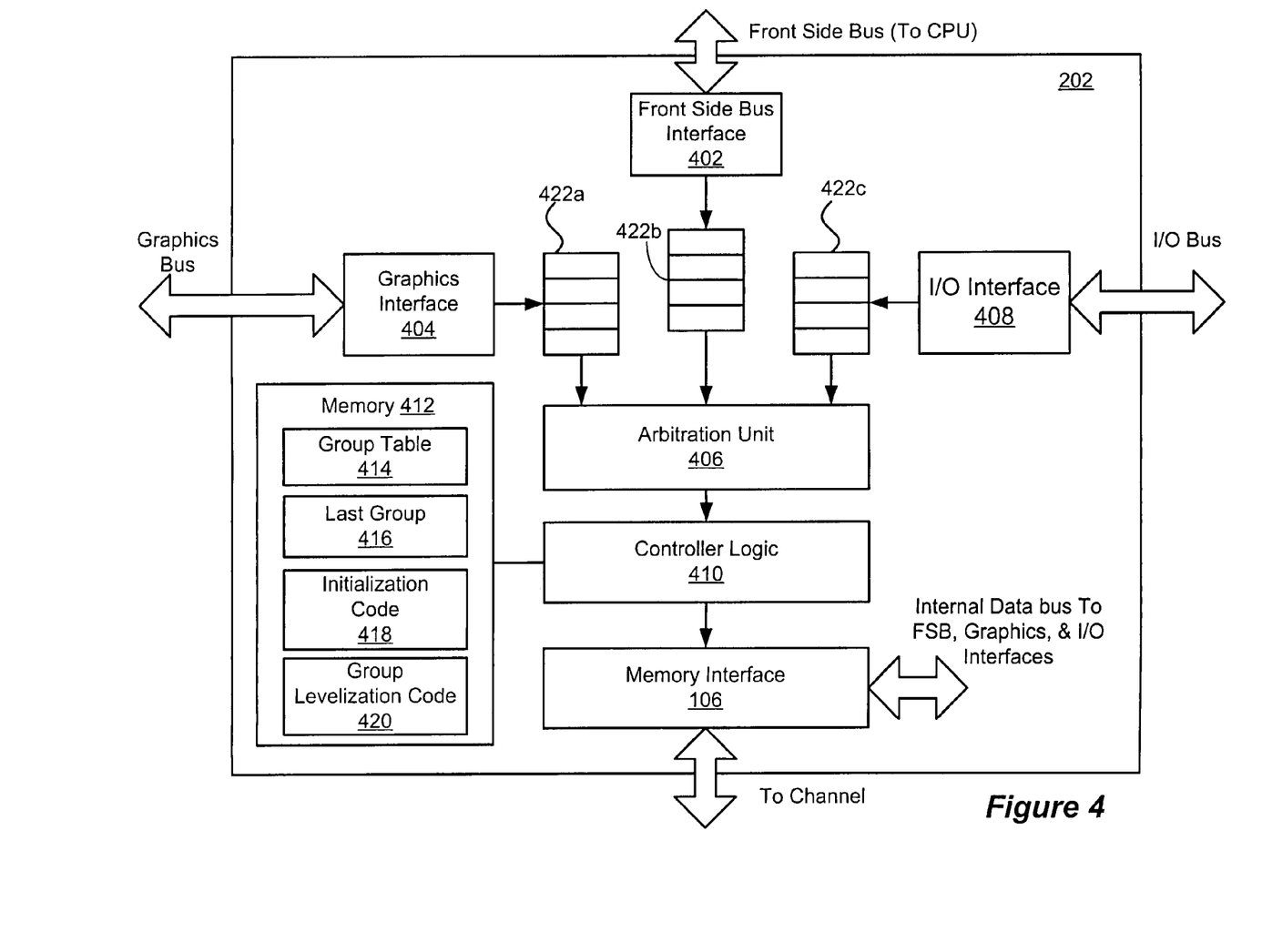
FIG. 4 is a block diagram of a memory controller for use in group levelization.

FIG. 4 is a block diagram of one embodiment of a memory controller 202 for use in group levelization. In some embodiments, the memory controller 202 includes a front side bus interface 402 (e.g., for handling communications with a data processor or CPU), a graphics interface 404 (e.g., AGP interface), an I/O interface 408, an arbitration unit 406, controller logic 410, memory 412, and high-speed memory interface 106. In some embodiments, one or more of these components are not included in the controller (e.g., the front side bus interface may be omitted in implementations in which the controller 202 is integrated with a CPU). The controller logic 410 is coupled to memory 412, which includes group table 414, last group 416, initialization code 418, and group levelization code 420. Note that FIG. 4 represents one particular embodiment of a memory controller. The disclosed group levelization techniques can be used with many types of memory controllers (e.g., memory controllers used in conjunction with Intel processors, AMD processors, GPUs, network processors, etc.). In some embodiments, the initialization code 418 and the group levelization code 420 are stored in a BIOS EPROM, which can be a separate chip coupled to the memory controller 202 via a bus or other interconnect structure.

During initialization of the memory controller 202, the initialization code 418 is executed by the controller logic 410. The initialization code is responsible for allocating memory devices to latency groups, and hence filling in the entries of the group table 414. The format and content of group table 414 are discussed in more detail below. In some embodiments, the group table 414 is not a static table, but is dynamically created every time the system is booted to account for changes in the system (e.g., memory may have been added or removed). In other embodiments, the group table 414 can be changed as memory access frequencies change.

Also during initialization, the group levelization code 420 is executed to make sure that all memory devices in each latency group have the same latency. When the system is first powered up, the access latency to the first device in a particular latency group may be lower than the access latency to the last device in the group. The group levelization code 420 is responsible for levelizing latency across all memory devices in the same group. To do this, the group levelization code 420 determines how much delay (if any) to add to each of the memory devices in the group so that they match the latency of the highest latency memory device in the group. The memory devices in each group having the lowest latency may have their delay devices 110 (FIG. 3) configured, for example by storing an appropriate value in register 306 (FIG. 3), under the control of the group levelization code. This process is then repeated for each latency group. In some embodiments, the group levelization code is implemented as part of the initialization code 418.

During operation, memory requests are received via interfaces 402, 404 and 408, and stored in queues 422. The memory requests stored in the queues 422 are examined for memory access contentions by the arbitration unit 406 using conventional arbitration techniques (e.g., round-robin, priorities, etc.). The arbitration unit 406 selects a memory request from the requests stored in queue 422 and forwards the selected memory request to the controller logic 410. The N-bit address (e.g., a 28-bit, 32-bit or 64-bit address) of the selected memory request is then decoded to access a particular bank, row, and column of a particular memory device 104. A sample address mapping (i.e., a map of the N address bits) is shown in Table I below:

TABLE I

| Sample Address Mapping | | | |
| --- | --- | --- | --- |
| Bit N-1 Device ID | Row | Bank | Bit 0 Column |

The Device ID field of the address contains a value indicative of a particular memory device in the memory system 200, the Bank field contains a value indicative of a sub-array within the memory device identified by Device ID, and the Row and Column fields contain values identify a specific location in the memory bank associated with the Device ID and Bank value. However, as explained next, the value of the Device ID does not specify the physical position of the associated memory device in the memory system.

The controller logic 410 extracts the Device ID (e.g., using bit masking techniques) from the memory address and uses it as an index into the group table 414. The group table had an entry for each respective memory device, indicating the latency group to which the respective memory device is assigned. In some embodiments, the group table 414 has the format shown in Table II below (with reference to FIG. 2):

TABLE II

Group Data Structure

| Device ID | Latency Group | Physical Device |
|---|---|---|
| 0 | Near Group ($G_1$) | 0 |
| 1 | Far Group ($G_2$) | N-2 |
| 2 | Far Group ($G_2$) | N-1 |
| . | . | |
| . | . | |
| . | . | |
| N-2 | Near Group ($G_1$) | 1 |
| N-1 | Near Group ($G_1$) | 2 |

Figure 6:
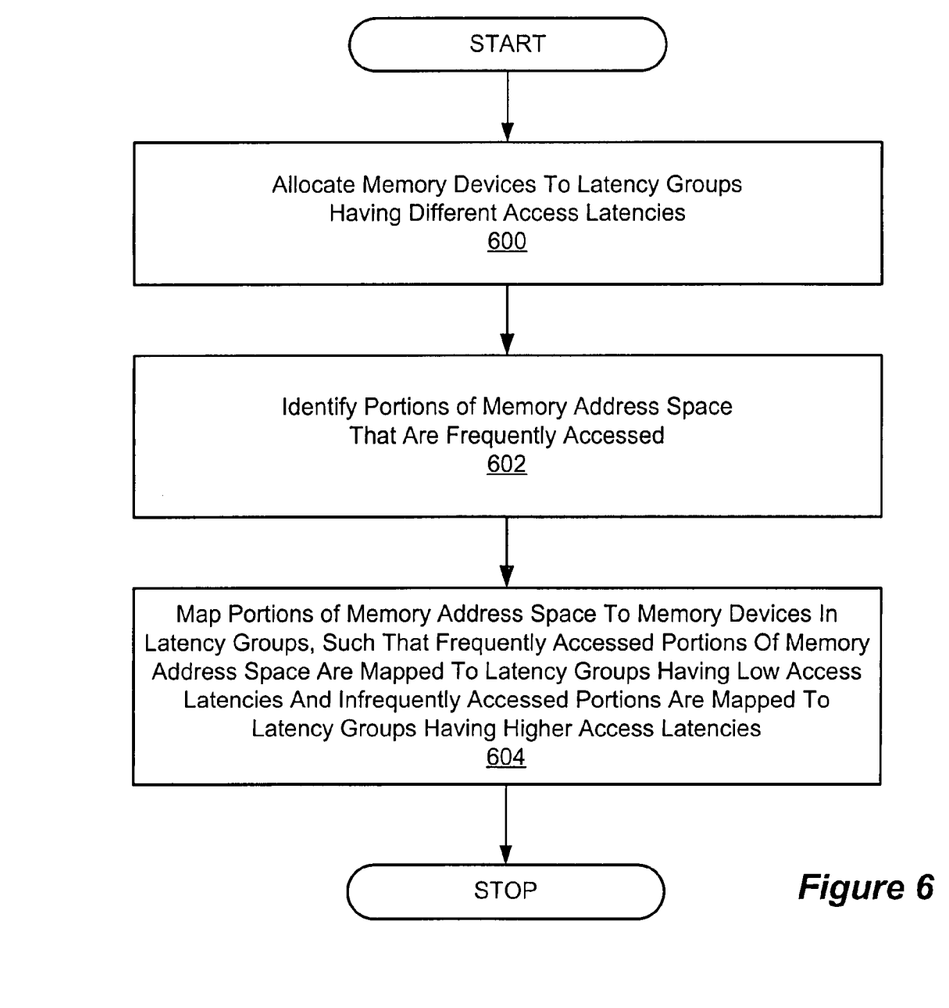
FIG. 6 is a flow diagram of a process of allocating memory addresses to memory devices for use in a memory system employing group levelization.

The group table 414 provides a mapping between memory addresses (as represented by their Device ID's) and latency groups $G_1 \ldots G_N$, to which the memory devices 104 are allocated, using the process described with respect to FIG. 6. While Table II also shows the positions of the physical memory devices whose Device ID's and Group values are stored in the group table, in some embodiments (e.g., in which memory devices are addressed using their Device ID's) the physical memory position is not stored in the group table 414. In other embodiments, the group table 414 stores the physical position of each memory device.

Once the physical memory device and latency group for the memory access request are determined from the group table 414, it may be necessary to delay back-to-back memory access requests if they are to different groups in order to avoid a data bus collision. If the latency groups of the back-to-back requests are different, and in particular if the current memory request is a request to read data in a memory device in a lower latency group than the latency group of the previous memory access request (which is identified by data stored in the last group data structure 416), then the controller logic 410 delays transmission of the current memory access command by an amount of time sufficient to avoid a collision between the data returned by the immediately preceding and current memory access commands. More generally, the group latencies of the current and previous memory access requests can be used to determine a minimum time delay between transmission of the previous memory access request and transmission of the current memory access request. If the time between the current and previous memory access requests is less than the determined minimum time delay, then transmission of the current memory access transaction must be delayed until at least the minimum time delay has elapsed since the transmission of the prior memory access request. Note that if the memory access requests are not back-to-back and are separated by a sufficient amount of time, there is no need to delay the subsequent memory access request because there will not be a data bus collision.

The delay between back-to-back memory access requests may be implemented in a number of ways, such as the execution of a predefined number of "no-op" commands by the controller logic 410 prior to sending the memory access commands, or by programming a timing circuit in the memory interface 106 to delay transmission of the memory access commands by a specified amount of time (e.g., a specified number of controller clock cycles or a specified number of memory bus cycles).

Using the above techniques, memory requests to memory addresses mapped to memory devices 104-0, 104-1 and 104-2, will have a group latency $L_1$, which is lower than the latency $L_G$ provided by global levelization. Similarly, memory requests to memory addresses mapped to memory devices 104-5 through 104-N, will have a group latency $L_2$, which is greater than or equal to the latency $L_G$ provided by global levelization.

Figure 5:
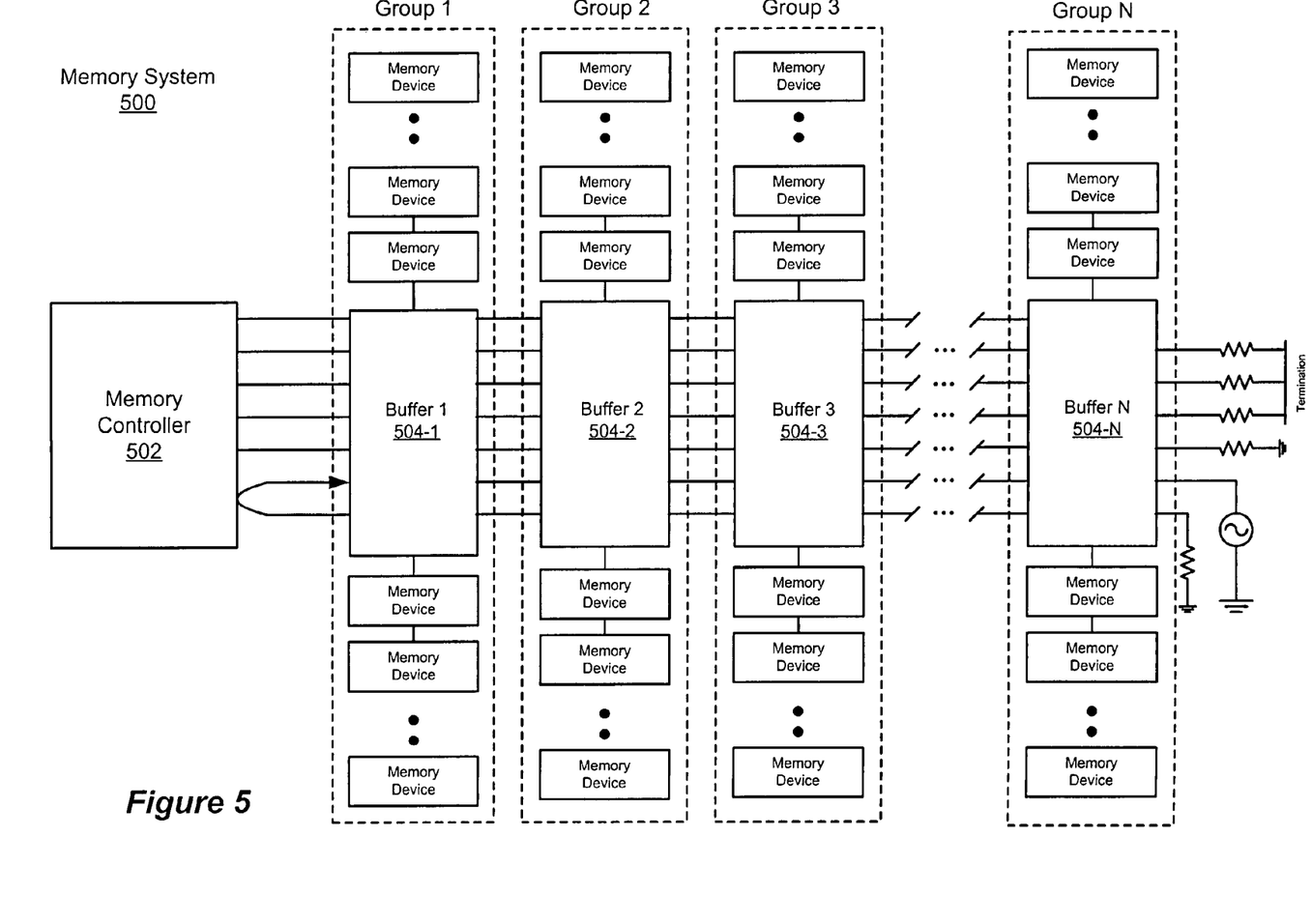
FIG. 5 is a block diagram of a memory system employing group levelization and including buffers for increased capacity.

FIG. 5 is a block diagram of a memory system 500 employing group levelization and including buffers for increased capacity and/or better signal integrity. The memory system 500 generally includes memory controller 502 coupled to series connected buffers 504. Each buffer is coupled to one or more memory devices, which collectively form a memory module. In some embodiments, group levelization can be implemented by designating each individual memory module to its own latency group. In other embodiments, memory devices within a module that are nearest the buffer may be in one latency group, while memory devices on the same module that are further from the buffer may be in another latency group. In this configuration, it is possible that subsets of memory devices on different modules can be in the same latency group. Alternatively, multiple memory modules can be assigned to the same latency group.

FIG. 6 is a flow diagram of a process for allocating memory addresses to memory devices for use in the memory system 200 employing group levelization. In some embodiments, the process for allocating memory addresses to memory devices occurs during memory system 200 initialization. The process begins by allocating (step 600) memory devices 104 to latency groups $G_1 \ldots G_N$. There can be any number of latency groups $G_1 \ldots G_N$, with each group having a different latency. Next, portions of the memory address space of the memory system 200 that are most frequently accessed are identified (step 602). This can be achieved through experiments conducted during system development or on-the-fly using a monitoring device (e.g., a memory access monitor circuit), monitoring software, or monitoring logic in the memory controller to monitor memory access requests and determine memory access frequencies for various portions of the memory address space. The final step includes mapping 604 the identified portions of the memory address space to memory devices 104 in the allocated latency groups. This results in the most frequently accessed addresses (or, more precisely, the most frequently accessed address ranges) being mapped to memory devices closest to the memory controller 202 to reduce average access latency. Note that access frequencies can change over time. Thus, an advantage of the group levelization technique over the conventional global levelization technique is the ability to dynamically change memory address mappings based on monitoring memory access frequencies. In other words, in some embodiments steps 602 and 604 are re-executed at appropriate times so as to remap the most frequently accessed address ranges to a latency group having the smallest latency, or more generally to a latency group having an associated latency smaller than the latency of at least one other latency group.

Figure 7:
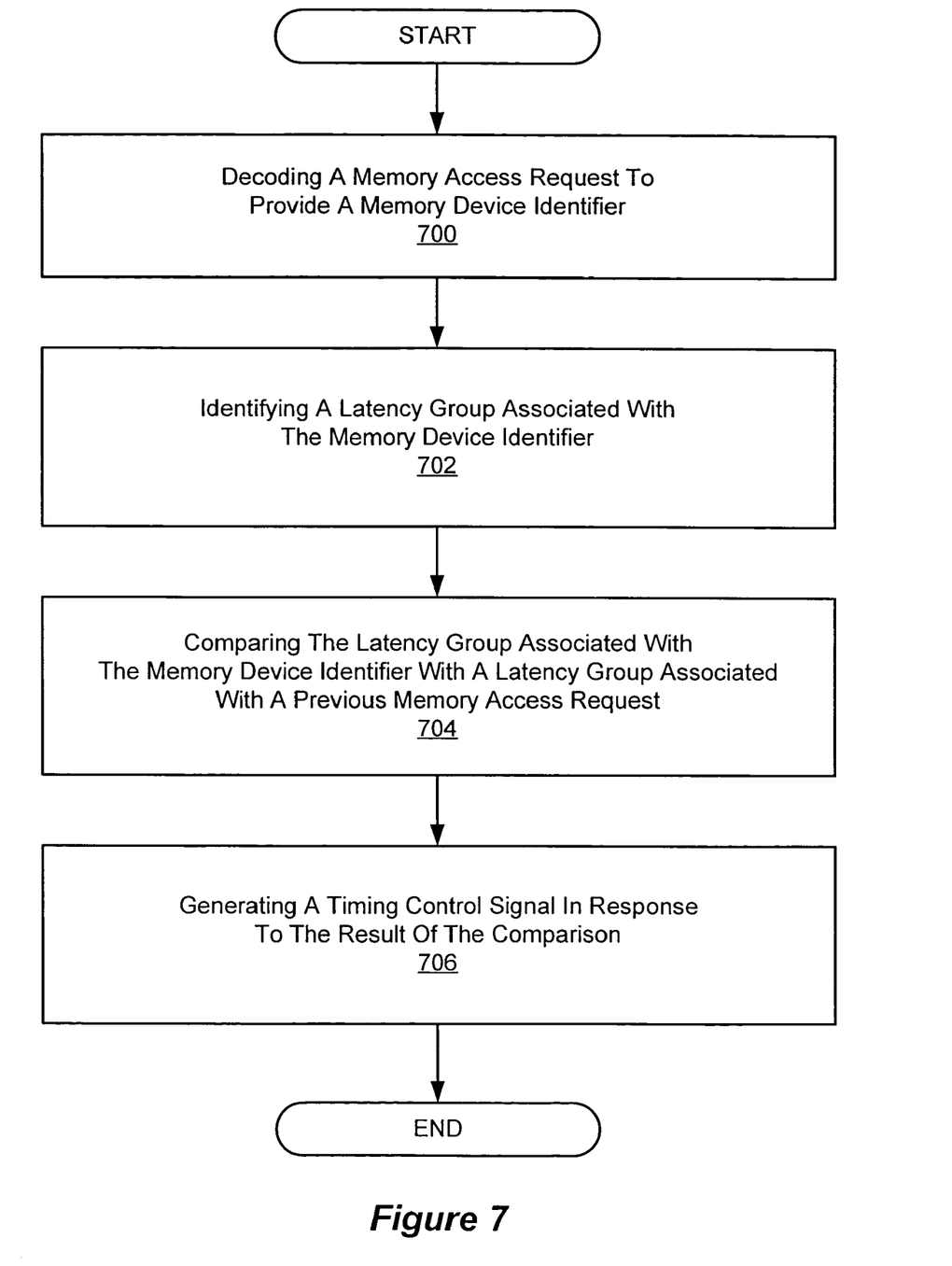
FIG. 7 is a flow diagram of a process of controlling latency in a memory system employing group levelization.

FIG. 7 is a flow diagram of a process of controlling latency in the memory system 200 employing group levelization. In some embodiments, the process for controlling latency in the memory system 200 employing group levelization occurs during memory system 200 operation. The process begins by decoding (step 700) a memory access request to provide a memory device ID. The memory system 200 identifies (step 702) a latency group associated with the memory device identifier. In some embodiments, this step is achieved by using the memory device ID as an index into the group table 414 having the structure shown in Table II. Once a latency group is identified (step 702), it is compared (step 704) with a latency group associated with a previous memory access request and the time of the previous memory access request. Responsive to the comparison (step 704), a timing control signal is generated (step 706). More specifically, if the current memory request is a request to read data in a memory device in a lower latency group than a memory read request immediately prior to the current request, then the timing control signal causes the controller logic to delay transmission of the current memory access command by an amount of time required to avoid a collision between the data returned by the immediately preceding and current memory access commands.

For some systems, it is possible that comparisons with multiple previous transactions are necessary to avoid a data bus collision. If the difference between the largest and smallest group latencies of the memory system is large (multiple memory bus cycles), then step 704 may need to compare the latency group of the current memory request with the latency group of each of the K prior memory access commands, where K represents the maximum number of prior memory access requests that can potentially interfere with a current memory access request. Furthermore, the amount by which the current memory request is delayed, if at all, is a function of the difference in group latencies between the potentially interfering memory requests, as well as the time that the potentially interfering memory requests occurred. For example, if the difference between the largest and smallest group latencies of the memory system is 8 memory bus cycles, and if each read request occupies 4 memory bus cycles on the memory bus, then the controller logic will need to compare the current latency group against multiple preceding memory access requests to ensure that no data bus collisions occur. If the current memory access request is found to interfere with any of the previous memory access requests, then the transmission of the memory access command for the current memory access request is delayed by the amount of time (e.g., a number of controller clock cycles or a number of memory bus cycles) required to avoid a collision of the data returned in response to the prior and current memory access requests.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed:

1. A method of controlling access to memory devices in a memory system, comprising:
   allocating memory devices in the memory system to latency groups including a first latency group and a second latency group, wherein the first latency group has a lower latency than the second latency group;
   identifying at least first and second portions of a memory address space;
   mapping the first portion of the address space to at least one memory device allocated to the first latency group; and
   mapping the second portion of the address space to at least one memory device allocated to the second latency group.

2. The method of claim 1, wherein said mapping provides the first portion of the address space with lower latency than the second portion of the address space, thereby resulting in improved system performance.

3. The method of claim 1, wherein the identifying is based on frequency of access to various portions of the memory address space, and wherein the first portion of the address space is more frequently accessed than the second portion of the address space.

4. The method of claim 1, further comprising:
   receiving a memory access request including a memory device identifier;
   determining the latency group of the memory device based on the identifier; and
   generating a timing control signal based on the latency group of the memory device.

5. The method of claim 4, wherein the step of determining the latency group of the memory device further comprises:
   comparing the latency group with a latency group associated with a previous memory request; and
   generating a timing control signal based on the comparison.

6. The method of claim 1, wherein the latencies of the first and second latency groups are due at least in part to electrical time of flight of signals on a channel interconnecting memory devices assigned to the first and second latency groups and a memory controller.

7. A memory device adapted for use in a memory system supporting multiple memory access latencies, comprising:
   a memory array;
   a command interface coupled to the memory array and adapted to be coupled to a memory system for receiving a delay value, wherein the delay value is associated with a respective latency group in a plurality of latency groups; and
   a delay device coupled to the command interface and an output data path, the delay device configured to delay data retrieved from the memory array and transmitted on the output data path for a delay period determined by the delay value.

8. The memory device of claim 7, wherein each latency group is associated with a different delay value.

9. The memory device of claim 8, wherein at least one delay value associated with at least one latency group is due at least in part to electrical time of flight of signals on a channel interconnecting memory devices assigned to that latency group and a memory controller.

10. The memory device of claim 7, wherein the delay value associated with the respective latency group is based on a highest access latency in the group.

11. The memory device of claim 7, wherein the memory device is included in a memory module and the memory module is allocated to the respective latency group.

12. The memory device of claim 11, wherein the memory module is coupled to the memory controller via a buffer.

13. The memory device of claim 7, wherein the delay device includes a shift register.

14. A method of controlling access to memory devices in a memory system supporting multiple memory access latencies, comprising:
   decoding a memory access request to provide a memory device identifier;
   identifying a latency group associated with the memory device identifier, wherein the latency group is one of a plurality of latency groups in the memory system;
   comparing the identified latency group with a latency group associated with a previous memory access request; and
   generating a timing control signal in response to the result of the comparison.

15. The method of claim 14, wherein generating a timing control signal further comprises:
   determining whether a minimum time difference, corresponding to the identified latency group and the latency group associated with the previous memory access request, is greater than a time difference between the memory access request and the previous memory access request; and
   when the determination is positive, delaying issuing of a memory access command for the memory access request for a time sufficient to avoid a bus collision.

16. The method of claim 15, wherein delaying issuing of a memory access command, further comprises:
   issuing at least one no operation command prior to issuing the memory access command.

17. The method of claim 14, wherein the timing control signal is used to delay transmission of a memory access command associated with the memory access request.

18. A computer program product for use in a computer system supporting multiple access latencies, the computer program product including a computer readable storage medium and a computer program mechanism embedded therein, the computer program mechanism comprising:
   decoding a memory access request to provide a memory device identifier;
   identifying a latency group associated with the memory device identifier; wherein the identified latency group is one of a plurality of latency groups in a memory system of the computer system;
   comparing the identified latency group with a latency group associated with a previous memory access request; and
   generating a timing control signal in response to the result of the comparison.

19. The computer program product of claim 18, wherein the latency group is identified by accessing a look-up table using the memory device identifier.

20. The computer program product of claim 18, wherein each latency group is associated with a different memory access latency.

21. The computer program product of claim 20, wherein at least one memory access latency associated with at least one latency group is due at least in part to electrical time of flight of signals on a channel interconnecting memory devices assigned to that latency group and a memory controller.

22. The computer program product of claim 20, wherein the memory access latency associated with the identified latency group is based on a highest access latency in the identified latency group.

23. A system for controlling access to memory devices in a memory system supporting multiple memory access latencies, comprising:
   memory adapted to be coupled to a processor and including a computer program product comprising instructions which, when executed by the processor, cause the processor to perform the operations of:
   decoding a memory access request to provide a memory device identifier;
   identifying a latency group associated with the memory device identifier; wherein the identified latency group is one of a plurality of latency groups in a memory system of the system;
   comparing the identified latency group with a latency group associated with a previous memory access request; and
   generating a timing control signal in response to the result of the comparison.

24. The system of claim 23, wherein the latency group is identified by accessing a look-up table using the memory device identifier.

25. The system of claim 23, wherein the latency group is selected from a number of latency groups, wherein each latency group is associated with a different memory access latency.

26. The system of claim 25, wherein at least one memory access latency associated with at least one latency group is due at least in part to electrical time of flight of signals on a channel interconnecting memory devices assigned to that latency group and a memory controller.

27. The system of claim 25, wherein the memory access latency associated with the identified latency group is based on a highest access latency in the identified latency group.

28. A system for controlling access to memory devices in a memory system supporting multiple memory access latencies, comprising:
   means for decoding a memory access request to provide a memory device identifier;
   means for identifying a latency group associated with the memory device identifier;
   wherein the identified latency group is one of a plurality of latency groups in a memory system of the system;
   means for comparing the identified latency group with a latency group associated with a previous memory access request; and
   means for generating a timing control signal in response to the result of the comparison.

29. The system of claim 28, wherein each latency group is associated with a different memory access latency.

30. The system of claim 29, wherein at least one memory access latency associated with at least one latency group is due at least in part to electrical time of flight of signals on a channel interconnecting memory devices assigned to that latency group and a memory controller.

31. A system, comprising:
   a memory controller;
   a first memory module coupled to the memory controller, wherein the first memory module includes a first buffer and a first memory device coupled to the first buffer, the first buffer having a first allocated memory access latency; and
   a second memory module coupled to the memory controller, wherein the second memory module includes a second buffer and a second memory device coupled to the second buffer, the second buffer having a second allocated memory access latency wherein the first memory access latency is lower than the second memory access latency.

32. The system of claim 31, wherein the second memory module is connected to the first memory module, and the memory controller, first memory module and second memory module are connected in series.

33. The system of claim 31, wherein the first allocated memory access latency comprises a time a read request is driven from the controller to the first buffer, to a time when read completion data is sent from the first buffer to the controller and sampled by the controller.

34. The system of claim 33, wherein the second allocated memory access latency comprises a time a read request is driven from the controller to the second buffer, to a time when read completion data is sent from the second buffer to the controller and sampled by the controller.

35. A memory module, comprising:
a first memory device having a first associated memory access latency;
a second memory device having a second associated memory access latency, wherein the first associated memory access latency is lower than the second associated memory access latency; and
a buffer coupled to the first and second memory devices, the buffer to be interposed between the memory devices and a memory controller.

36. A system, comprising:
a memory controller; and
a first memory module, the first memory module including:
a buffer coupled to the memory controller;
a first memory device coupled to the buffer; and
a second memory device coupled to the buffer,
wherein the first memory device has a first associated memory access latency and the second memory device has a second associated memory access latency, wherein the first associated memory access latency is lower than the second associated memory access latency.

37. A method of accessing memory devices disposed on first and second memory modules, the method comprising:
allocating a first memory access latency to the first memory module, the first memory module including a first buffer and a first memory device coupled to the first buffer; and
allocating a second memory access latency to the second memory module, the second memory module including a second buffer and a second memory device coupled to the second buffer, wherein the first memory access latency is lower than the second memory access latency.

38. The system of claim 36, wherein the first memory device and the second memory device are connected in series to the buffer.

* * * * *